United States Patent
Miyato

(10) Patent No.: US 11,593,663 B2
(45) Date of Patent: Feb. 28, 2023

(54) DATA DISCRIMINATOR TRAINING METHOD, DATA DISCRIMINATOR TRAINING APPARATUS, NON-TRANSITORY COMPUTER READABLE MEDIUM, AND TRAINING METHOD

(71) Applicant: PREFERRED NETWORKS, INC., Tokyo (JP)

(72) Inventor: Takeru Miyato, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 404 days.

(21) Appl. No.: 16/726,153

(22) Filed: Dec. 23, 2019

(65) Prior Publication Data
US 2020/0134473 A1   Apr. 30, 2020

Related U.S. Application Data

(63) Continuation of application No. PCT/JP2018/024569, filed on Jun. 28, 2018.

(30) Foreign Application Priority Data

Jun. 29, 2017 (JP) .............................. JP2017-127769

(51) Int. Cl.
G06N 3/08 (2006.01)
G06N 3/04 (2006.01)
G06N 3/088 (2023.01)

(52) U.S. Cl.
CPC ........... *G06N 3/088* (2013.01); *G06N 3/0454* (2013.01)

(58) Field of Classification Search
CPC .... G06N 3/088; G06N 3/0454; G06N 3/0481; G06N 3/0472; G06N 3/084; G06N 3/08; G06N 20/00; G06N 3/02; G06N 3/0445; G06T 7/143; G06T 11/00; G06T 5/001; G06T 2207/20084; G06T 2207/20081; G06T 5/00; G06T 7/90;
(Continued)

(56) References Cited

U.S. PATENT DOCUMENTS 5,479,523 A * 12/1995 Gaborski ............. G06K 9/6228
382/190
10,685,284 B2 * 6/2020 Smyth .................. G06N 3/0454
(Continued)

OTHER PUBLICATIONS

Martin Arjovsky et al., "Wasserstein GAN", arXiv:1701.07875, 2017.
(Continued)

*Primary Examiner* — Lana N Le
(74) *Attorney, Agent, or Firm* — Foley & Lardner LLP

(57) ABSTRACT

A model generation method includes updating, by at least one processor, a weight matrix of a first neural network model at least based on a first inference result obtained by inputting, to the first neural network model which discriminates between first data and second data generated by using a second neural network model, the first data, a second inference result obtained by inputting the second data to the first neural network model, and a singular value based on the weight matrix of the first neural network model. The model generation method also includes at least based on the second inference result, updating a parameter of the second neural network model.

31 Claims, 12 Drawing Sheets

(58) Field of Classification Search
CPC ............. G06T 2207/20076; G06T 7/00; G06T 11/60; G06K 9/6298; H04L 25/03019; H04L 1/0001; H04L 2025/03783; H04L 27/2613; H04B 7/0615; G06F 17/16; G06F 16/285; G06F 30/27; G06F 16/35

See application file for complete search history.

(56) References Cited

U.S. PATENT DOCUMENTS

| | | | | |
|---|---|---|---|---|
| 2010/0260288 | A1* | 10/2010 | Aoki | H04B 7/0452 375/296 |
| 2011/0244816 | A1* | 10/2011 | Mori | H04L 27/2613 455/101 |
| 2012/0155345 | A1* | 6/2012 | Mori | H04L 27/2613 370/310 |
| 2019/0332935 | A1* | 10/2019 | Sanchez Bermudez | G06T 7/20 |
| 2020/0097766 | A1* | 3/2020 | Min | G06N 3/088 |
| 2020/0134473 | A1* | 4/2020 | Miyato | G06N 3/084 |
| 2020/0151508 | A1* | 5/2020 | Yang | G06T 11/60 |
| 2021/0012228 | A1* | 1/2021 | Yaguchi | G06N 20/00 |
| 2021/0060768 | A1* | 3/2021 | Nitta | G06N 5/04 |
| 2021/0065000 | A1* | 3/2021 | Song | H04L 67/1004 |
| 2021/0081781 | A1* | 3/2021 | Tanizawa | G06N 20/20 |
| 2021/0192348 | A1* | 6/2021 | Ishii | G06N 3/0454 |
| 2022/0014807 | A1* | 1/2022 | Lin | G06N 3/0445 |
| 2022/0092742 | A1* | 3/2022 | Pei | G06N 3/088 |
| 2022/0101527 | A1* | 3/2022 | Wang | G06N 3/088 |
| 2022/0230276 | A1* | 7/2022 | Clark | G06N 3/088 |

OTHER PUBLICATIONS

Devansh Arpit et al., "Normalization Propagation: A Parametric Technique for Removing Internal Covariate Shift in Deep Networks", arXiv: 1603.01431, 2016.

Vincent Dumoulin et al., "Adversarially Learned Inference", ICLR, 2017.

Xavier Glorot et al., "Deep Sparse Rectifier Neural Networks", AISTATS, 2011.

Ian J. Goodfellow et al., "Generative Adversarial Nets", NIPS, 2014.

Ishaan Gulrajani et al., "Improved Training of Wasserstein GANs", arXiv:1704.00028, 2017.

Kaiming He et al., "Deep Residual Learning for Image Recognition", CVPR, 2016.

Jonathan Ho et al., "Generative Adversarial Imitation Learning", NIPS, 2016.

Sergey Ioffe et al., "Batch Normalization: Accelerating Deep Network Training by Reducing Internal Covariate Shift", ICML, 2015.

Kevin Jarrett et al., "What is the Best Multi-Stage Architecture for Object Recognition?", ICCV, 2009.

Kui Jia. "Improving training of deep neural networks via Singular Value Bounding" arXiv:1611.06013, 2017.

Diederik P. Kingma et al., "Adam: a Method for Stochastic Optimization", arXiv:1412.6980, 2017.

Jiwei Li et al., "Adversarial Learning for Neural Dialogue Generation", arXiv:1701.06547, 2017.

Andrew L. Maas et al., "Rectifier Nonlinearities Improve Neural Network Acoustic Models", ICML, 2013.

Shakir Mohamed et al., "Learning in Implicit Generative Models", arXiv:1610.03483, 2016.

Vinod Nair et al., "Rectified Linear Units Improve Restricted Boltzmann Machines", ICML, 2010.

Guo-Jun Qi. "Loss-Sensitive Generative Adversarial Networks on Lipschitz Densities", arXiv:1701.06264, 2017.

Alec Radford et al., "Unsupervised representation learning with deep convolutional generative adversarial networks", arXiv: 1511.06434, 2015.

Masaki Saito et al., "Temporal Generative Adversarial Nets", arXiv:1611.06624, 2016.

Tim Salimans et al., "Weight Normalization: A Simple Reparameterization to Accelerate Training of Deep Neural Networks", NIPS, 2016.

Tim Salimans et al., "Improved Techniques for Training GANs", NIPS, 2016.

Dustin Tran et al., "Hierarchical Implicit Models and Likelihood-Free Variational Inference", arXiv:1702.08896, 2017.

Masatosi Uehara et al., "Generative Adversarial Nets from a Density Ratio Estimation Perspective", arXiv:1610.02920, 2016.

David Warde-Farley et al., "Improving generative adversarial networks with denoising feature matching", ICLR, 2017.

Martin Arjovsky et al., "Towards principled methods fortraining generative adversarial networks", ICLR, 2017.

Martin Arjovsky et al., "Wasserstein Generative Adversarial Networks", ICML, 2017.

Jimmy Lei Ba et al., "Layer Normalization", arXiv:1607.06450, 2016.

Andrew Brock et al., "Neural photo editing with introspective adversarial networks", arXiv:1609.07093, 2016.

Adam Coates et al., "An Analysis of Single-Layer Networks in Unsupervised Feature Learning", AISTATS, 2011.

Harm de Vries et al., "Modulating early visual processing by language", NIPS, 2017.

D. C. Dowson et al., "The Fréchtet Distance between Multivariate Normal Distributions", Journal of Multivariate Analysis, 1982.

Vincent Dumoulin et al., "A learned representation for artistic style", ICLR, 2017.

Gene H. Golub et al., "Eigenvalue computation in the 20th century", Journal of Computational and Applied Mathematics, 2000.

Martin Heusel et al., "GANs Trained by a Two Time-Scale Update Rule Converge to a Nash Equilibrium", arXiv:1706.08500, 2017.

Kui Jia et al., "Improving training of deep neural networks via Singular Value Bounding", CVPR, 2017.

Jiwei Li et al., "Adversarial Learning for Neural Dialogue Generation", EMNLP, 2017.

Jae Hyun Lim et al., "Geometric GAN", arXiv:1705.02894, 2017.

Mehdi Mirza et al., "Conditional Generative Adversarial Nets", arXiv:1411.1784, 2014.

Takeru Miyato et al., "cGANs with projection discriminator", ICLR, 2018.

Shakir Mohamed et al., "Learning in Implicit Generative Models", arXiv:1610.03483, 2017.

Sebastian Nowozin et al., "f-GAN: Training Generative Neural Samplers using Variational Divergence Minimization", NIPS, 2016.

Augustus Odena et al., "Conditional Image Synthesis with Auxiliary Classifier GANs", ICML, 2017.

Alec Radford et al., "Unsupervised representation learning witn deep convolutional generative adversarial networks", arXiv: 1511.06434, 2016.

Olga Russakovsky et al., "ImageNet Large Scale Visual Recognition Challenge", arXiv:1409.0575, 2015.

Masaki Saito et al., "Temporal Generative Adversarial Nets with Singular Value Clipping", ICCV, 2017.

Christian Szegedy et al., "Going Deeper with Convolutions", CVPR, 2015.

Seiya Tokui et al., "Chainer: a Next-Generation Open Source Framework for Deep Learning", NIPS, 2015.

Antonio Torralba et al., "80 million tiny images: a large dataset for non-parametric object and scene recognition", IEEE Transactions on Pattern Analysis and Machine Intelligence, 2008.

Dustin Tran et al., "Deep and Hierarchical Implicit Models", arXiv:1702.08896, 2017.

Sitao Xiang et al., "On the Effects of Batch and Weight Normalization in Generative Adversarial Networks", arXiv:1704.03971, 2017.

Jianwei Yang et al., "LR-GAN: Layered recursive generative adversarial networks for image generation", ICLR, 2017.

Yuichi Yoshida et al., "Spectral Norm Regularization for Improving the Generalizability of Deep Learning", arXiv:1705.10941,2017.

Chenghao Cai et al., "Fast Learning of Deep Neural Networks via Singular Value Decomposition", PRICAI, 2014.

Evgeny Zamyatin et al., "Learning to Generate Chairs with Generative Adversarial Nets" arXiv: 1705.10413v1 [cs.CV] May 29, 2017.

(56) References Cited

OTHER PUBLICATIONS

Jamie Hayes et al., "LOGAN: Membership Inference Attacks Against Generative Models" arXiv: 1705.07663v4 [cs.CR] Aug. 21, 2018.
Vincent Dumoulin et al., "A Learned Representation for Artistic Style", arXiv:1610.07629v5 [cs.CV] Feb. 9, 2017.
Takeru Miyato et al., "Spectral Normalization for Generative Adversarial Networks", arXiv:1802.05957v1 [cs.LG] Feb. 16, 2018.
Alec Radford & Luke Metz et al., "Unsupervised Representation Learning with Deep Convolutional Generative Adversarial Networks" arXiv:1511.06434v2 [cs.LG] Jan. 7, 2016 https://arxiv.org/pdf/1511.06434v2.pdf.
Dustin Tran et al., "Deep and Hierarchical Implicit Models" arXiv:1702.08896v2 [stat.ML] Mar. 13, 2017 https://arxiv.org/pdf/1702.08896v2.pdf.
Ian J. Goodfellow et al., "Generative Adversarial Nets" arXiv:1406.2661v1 [stat.ML] Jun. 10, 2014 https://arxiv.org/pdf/1406.2661.pdf.
Ishaan Gulrajani et al., "Improved Training of Wasserstein GANs" arXiv:1704.00028v2 [cs.LG] May 29, 2017 https://arxiv.org/pdf/1704.00028v2.pdf.
Jamie Hayes et al., "LOGAN: Evaluating Privacy Leakage of Generative Models Using Generative Adversarial Networks" arXiv:1705.07663v1 [cs.CR] May 22, 2017 https://arxiv.org/pdf/1705.07663v1.pdf.
Jianwei Yang et al., "LR-GAN: Layered Recursive Generative Adversarial Network for Image Generation" arXiv:1703.01560v1 [cs.CV] Mar. 5, 2017 https://arxiv.org/pdf/1703.01560v1.pdf.
Jiwei Li et al., "Adversarial Learning for Neural Dialogue Generation" arXiv:1701.06547v4 [cs.CL] Feb. 22, 2017 https://arxiv.org/pdf/1701.06547v4.pdf.
Martin Arjovsky et al., "Wasserstein GAN" arXiv:1701.07875v2 [stat.ML] Mar. 9, 2017 https://arxiv.org/pdf/1701.07875v2.pdf.
Martin Heusel et al., "GANs Trained by a Two Time-Scale Update Rule Converge to a Nash Equilibrium" arXiv:1706.08500v2 [cs.LG] Jun. 27, 2017 https://arxiv.org/pdf/1706.08500v2.pdf.
Masaki Saito et al., "Temporal Generative Adversarial Nets" arXiv:1611.06624v1 [cs.LG] Nov. 21, 2016 https://arxiv.org/pdf/1611.06624v1.pdf.
Sebastian Nowozin et al., "f-GAN:Training Generative Neural Samplers using Variational Divergence Minimization" arXiv:1606.00709v1 [stat.ML] Jun. 2, 2016 https://arxiv.org/pdf/1606.00709.pdf.
Sitao Xiang et al., "On the Effects of Batch and Weight Normalization in Generative Adversarial Networks" arXiv:1704.03971v3 [stat.ML] May 22, 2017 https://arxiv.org/pdf/1704.03971v3.pdf.

* cited by examiner

| SETTING | $\alpha$ | $\beta_1$ | $\beta_2$ | $n_{dis}$ |
|---|---|---|---|---|
| A | 0.0001 | 0.5 | 0.9 | 5 |
| B | 0.0001 | 0.5 | 0.999 | 1 |
| C | 0.0002 | 0.5 | 0.999 | 1 |
| D | 0.001 | 0.5 | 0.9 | 5 |
| E | 0.001 | 0.5 | 0.999 | 5 |
| F | 0.001 | 0.9 | 0.999 | 5 |

| METHOD | INCEPTION SCORE |
|---|---|
| (Real data) | 11.24±.12 |
| Warde-Farley | 7.72±.13 |
| LR-GAN | 7.17±.07 |
| DCGAN | 6.64±.14 |
| ALI | 5.34±.05 |
| Spectral Normalizaiton | 7.41±.12 |
| Weight Normalization | 7.01±.07 |
| WGAN-GP | 6.68±.06 |

FIG. 5A

| METHOD | INCEPTION SCORE |
|---|---|
| (Real data) | 26.08±.26 |
| Warde-Farley | 8.51±.13 |
| Spectral Normalizaiton | 8.60±.09 |
| Weight Normalization | 7.16±.10 |
| WGAN-GP | 8.42±.13 |

FIG. 5B

| METHOD | INCEPTION SCORE |
|---|---|
| (Standard CNN) | |
| COMPARATIVE EXAMPLE 2 + SN | 7.20±.08 |
| COMPARATIVE EXAMPLE 2 + COMPARATIVE EXAMPLE 1 | 6.36±.04 |
| COMPARATIVE EXAMPLE 2 | 6.68±.06 |
| (ResNet) | |
| COMPARATIVE EXAMPLE 2 + SN | 7.70±.07 |
| COMPARATIVE EXAMPLE 2 | 7.64±.08 |

FIG .11

DATA DISCRIMINATOR TRAINING METHOD, DATA DISCRIMINATOR TRAINING APPARATUS, NON-TRANSITORY COMPUTER READABLE MEDIUM, AND TRAINING METHOD

CROSS-REFERENCE TO RELATED APPLICATIONS

This application is continuation application of International Application No. JP2018/024569 filed on Jun. 28, 2018, which claims priority to Japanese Patent Application No. 2017-127769 filed on Jun. 29, 2017, the entire contents of which are incorporated herein by reference.

FIELD

Embodiments described herein relate to a data discriminator training method, a data discriminator training apparatus, a non-transitory computer readable medium, and a training method.

BACKGROUND

Generative Adversarial Networks are widely studied as a framework of a generative model and applied to various datasets in recent years. The GAN is a framework for generating a model distribution obtained by modeling a given target distribution, and is configured by a generator which generates the model distribution and a discriminator which discriminates the model distribution from a target. In each step, the best discriminator is continuously trained so as to reduce a difference between the model distribution and the target distribution measured by the discriminator.

In the training of the GAN, control of performance of the discriminator becomes a problem. In high-dimensional space, density ratio estimation by using the discriminator is often inaccurate and unstable during the training. As a result, a generator network cannot learn a multimodal structure of the target distribution. Moreover, when a support for the model distribution and a support for the target distribution are separated, a discriminator capable of completely discriminating the model distribution from the target distribution is present. In this situation, when such a discriminator is generated, a derivative of the discriminator with respect to an input becomes "0" (zero), which stops the training of the generator.

BRIEF DESCRIPTION OF THE DRAWINGS

FIG. 5A is a chart illustrating inception scores in the comparative experiment.

FIG. 5B is a chart illustrating inception scores in the comparative experiment.

FIG. 11 is a chart illustrating inception scores in the comparative experiment.

DETAILED DESCRIPTION

Figure 1:
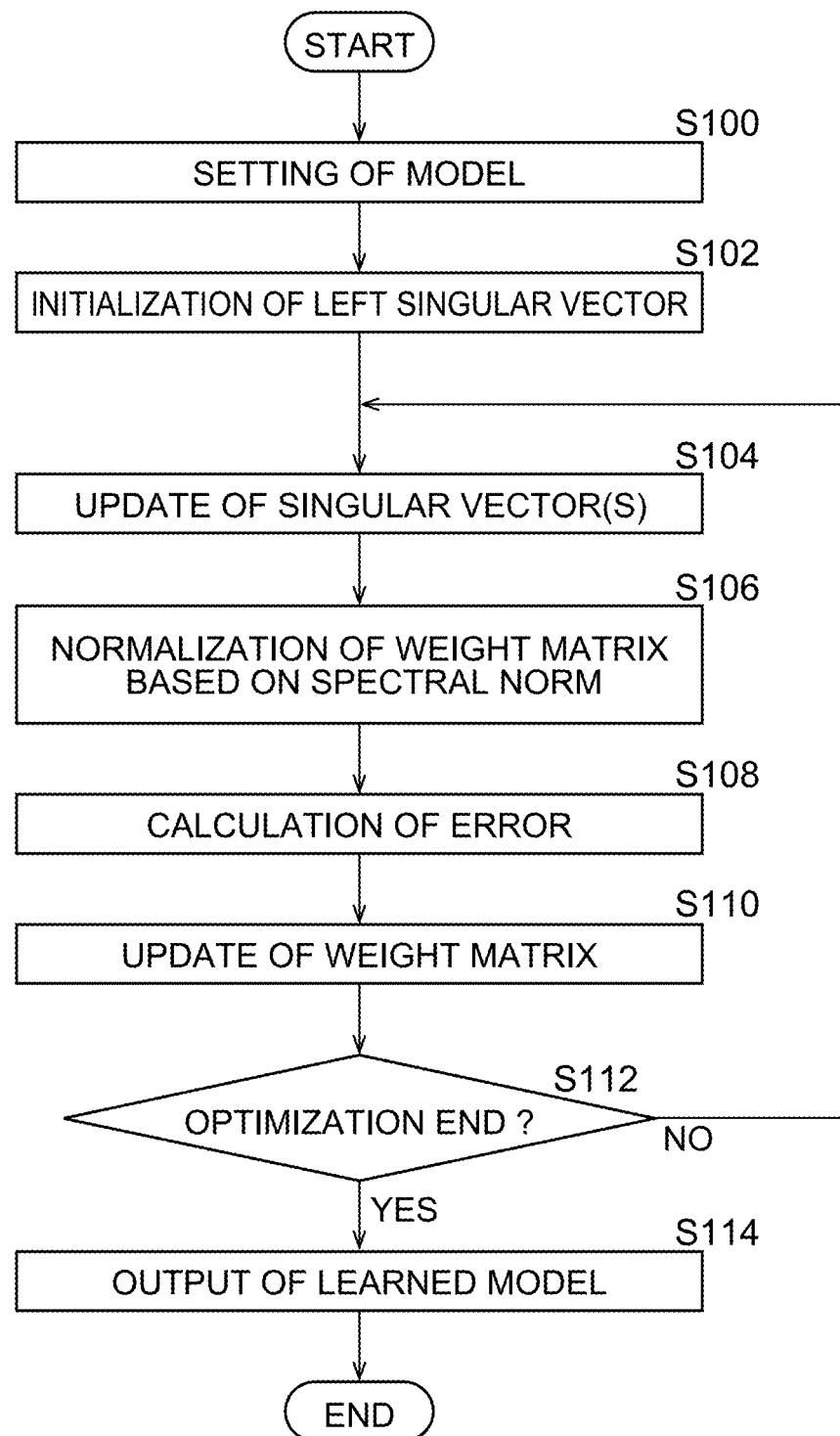
FIG. 1 is a flowchart illustrating a flow of learning of a data discriminator according to an embodiment.

According to some embodiments, a model generation method includes updating a weight matrix of a first neural network model, by at least one processor, at least based on a first inference result obtained by inputting, to the first neural network model which discriminates between first data and second data generated by using a second neural network model, the first data, a second inference result obtained by inputting the second data to the first neural network model, and a singular value obtained based on a weight matrix of the first neural network model. The method also includes updating a parameter of the second neural network model at least based on the second inference result.

Hereinafter, in an explanatory text, a bar denoted at an upper portion of a variable or a function in a mathematical expression is represented as "/", and a hat is represented as "^" and a tilde is represented as "~" the same as the above. For example, x is represented as "x/", "x^", and "x~" respectively when denoted by the above ones. Further, "T" represents each transposition of a vector or a matrix when written with respect to the vector or the matrix on the right side thereof.

(Generative Adversarial Networks)

First, generative adversarial networks (hereinafter, mentioned as GAN) which become a base of this embodiment are briefly explained. The GAN includes a generator and a discriminator, and is a kind of a training method of a generative model which concurrently learns the generator and the discriminator.

The generator (data generator) performs the learning of training data (correct answer data) being target data to generate similar data (false data) to the training data. This generator is learned as a model which outputs the false data when noise data is inputted. The discriminator (data discriminator) discriminates between the false data generated by the generator and the correct answer data. That is, the generator is learned so that a distribution of the target data (a distribution of the training data) and a distribution of the generated model coincide with each other, and on the other hand, the discriminator is learned so as to discriminate between the correct answer data and the false data.

In this learning, two of a generator network and a discriminator network are present. As the network, for example, a multi-layer perceptron (MLP), a convolutional neural network (CNN), or the like is used.

For example, a network of the discriminator by using the MLP represented by the following expression is explained. Note that, also in the CNN, for example, the following expression can also be used regarding each weight matrix in convolution layers, and normalization of a weight matrix according to this embodiment can be similarly applied.

$$h_I := a_I(W^I h_{I-1} + b^I), I \in [1, \ldots, L].\quad\text{eq. 1}$$

A vector $h_I$ indicates an output of an I-th layer, a matrix $W^I$ indicates a weighting matrix between an (I−1)-th layer and the I-th layer, a vector $b^I$ indicates a bias in the I-th layer, and $a_I$ indicates a nonlinear activation function for each element. Here, when dim(I) is set to represent a dimension of I, and R is set to represent a real number field, $W^I \in R^{dim(I) \times dim(I-1)}$, $b^I \in R^{dim(I)}$, $h_I \in R^{dim(I)}$, and $h_0(x) = x$ are obtained. By construing the above-described expressions as a series of configurations, an output of a final layer of a network having an input vector x becomes $h_L$. In the following explanation, for simplicity, mention is made as $f(x) = h_L(x)$.

By such a definition, A is set as the activation function corresponding to divergence of distance measurement which a user has selected, and an output of the discriminator is given as $D(x) = A(f(x))$. A standard format of the GAN is represented as the following expression.

$$\min_G \max_D V(G, D),\quad\text{eq. 2}$$

Here, G is set as an output of the generator. A maximum value and a minimum value of G and D are each handed over to a set of the generator and the discriminator. A general expression of V(G, D) is given as follows.

$$E_{x \sim q}[\log D(x)] + E_{x' \sim p_G}[\log(1 - D(x'))],\quad\text{eq. 3}$$

Here, $E[\cdot]$ represents an expected value, q is a distribution of the target data, $p_G$ is a distribution in the generator of the model to be learned via adversarial minimum maximum optimization, and x' is the false data generated by the generator. The activation function A to be used in D of this format is, for example, a continuous function in a range of [0,1] such as a sigmoid function. With respect to the fixed generator G, the optimum discriminator of this format of V(G, V) is known to be given by $D_G^*=q(x)/(q(x)+p_G(x))$.

A function space in which the discriminator has been selected is considered to decisively affect performance of the GAN. In many studies, for the purpose of ensuring boundedness of statistics, importance of Lipschitz continuity is indicated. In consideration of the above, for example, the optimum discriminator of the GAN is represented as follows.

$$D_G^*(x) = \frac{q(x)}{q(x)+p_G(x)} = \text{sigmoid}(f^*(x)),\quad\text{eq. 4}$$

where $f^*(x) = \log q(x) - \log p_G(x)$,

This differential is represented as follows, and this can be unbound or incomputable.

$$\nabla_x f^*(x) = \frac{1}{q(x)} \nabla_x q(x) - \frac{1}{p_G(x)} \nabla_x p_G(x)\quad\text{eq. 5}$$

Thus, in this array, there is a method of controlling a Lipschitz constant of the discriminator by adding a defined normalization term to an input sample x. As in the following expression, a discriminator D is searched from a set of a Lipschitz continuous function.

$$\arg\max_{\|f\|_{Lip} \leq K} V(G, D),\quad\text{eq. 6}$$

Here, $\|f\|_{Lip} \leq K$ means $\|f(x)-f(x')\|/\|x-x'\| \leq K$ with respect to any x and x'. However, a norm ($\|\cdot\|$) represents an $L^2$ norm.

The regularization based on an input allows relatively easy formalization based on a sample, but excluding heuristic and a means close thereto, it is difficult to impose normalization with respect to the space outside the generator and a support for the target data distribution. Thus, in this embodiment, a weight matrix is normalized by using spectral normalization.

(Spectral Normalization)

For example, when the activation function $a_I$ is set as ReLU (Rectified Linear Unit) and leakyReLU, $\|a_I\|_{Lip}=1$ is obtained. In a case where each activation function $a_I$ satisfies $\|a_I\|_{Lip}=1$, an inequality $\|g_1*g_2\|_{Lip} \leq \|g_1\|_{Lip} \cdot \|g_2\|_{Lip}$ is obtained, which makes it possible to constrain $\|f\|_{Lip}$ from above as follows. However, in the above-described inequality, $g_1*g_2$ means a composite function of $g_1$ and $g_2$.

$$\|f\|_{Lip} \leq \|a_L\|_{Lip} \cdot \|(h_{L-1} \mapsto W^L h_{L-1} + b)\|_{Lip} \ldots\quad\text{eq. 7}$$
$$\|a_1\|_{Lip} \cdot \|(h_0 \mapsto W^1 h_0 + b)\|_{Lip} =$$
$$\sum_{l=1}^{L} \|(h^{l-1} \mapsto W^l h^{l-1} + b)\|_{Lip} = \prod_{l=1}^{L} \sigma(W^l)$$

Here, σ(W) is a spectral norm being an $L^2$ norm of a matrix W, and is represented as the one equal to a maximum singular value of W as follows.

$$\sigma(W) := \max_{h:h \neq 0} \frac{\|Wh\|_2}{\|h\|_2} = \max_{\|h\|_2 \leq 1} \|Wh\|_2,\quad\text{eq. 8}$$

The spectral normalization can normalize a spectral norm of a weight matrix W and set a Lipschitz constant to be 1, as follows.

$$\overline{W}_{SN}(W) := W/\sigma(W)\quad\text{eq. 9}$$

When each $W^I$ is normalized by using [eq. 9], $\|f\|_{Lip}$ is constrained from above by 1, to therefore establish the inequality of [eq. 7], which allows $\sigma(W/_{SN}(W))=1$.

A gradient of $W/_{SN}(W)$ with respect to $W_{ij}$ is represented as follows.

$$\frac{\partial \overline{W}_{SN}(W)}{\partial W_{ij}} = \frac{1}{\sigma(W)} E_{ij} - \frac{1}{\sigma(W)^2} \frac{\partial \sigma(W)}{\partial W_{ij}} W =\quad\text{eq. 10}$$
$$\frac{1}{\sigma(W)} E_{ij} - \frac{[u_1 v_1^T]_{ij}}{\sigma(W)^2} W = \frac{1}{\sigma(W)} (E_{ij} - [u_1 v_1^T]_{ij} \overline{W}_{SN}),$$

Here, $E_{ij}$ represents a matrix in which a (i, j) element is 1 and the other elements are "0" (zero), $u_1$ is a first left singular vector of $W_I$, and $v_1$ is a first right singular vector of W. The first left singular vector and the first right singular vector indicate, in a case of performing a singular value decomposition on W, in a singular value matrix obtained by sorting singular value components in descending order from the upper left toward the lower right, a left singular vector and a right singular vector each corresponding to a singular value being the upper left component (a first singular value).

If h is a hidden node to be converted by the weight matrix W in the network, a derivative of V(G, V) calculated on a mini batch regarding W of the discriminator D is given as follows.

$$\frac{\partial V(G, D)}{\partial W} = \frac{1}{\sigma(W)}(\hat{E}[\delta h^T] - (\hat{E}[\delta^T(\overline{W}_{SN}h)])u_1 v_1^T) = \frac{1}{\sigma(W)}(\hat{E}[\delta h^T] - \lambda u_1 v_1^T) \quad \text{eq. 11}$$

Here, $\hat{E}[\cdot]$ represents an empirical expected value in the mini batch, and is $\delta=(\partial V(G, V)/\partial (W/_{SN}h))^T$ and $\lambda=\hat{E}[\partial^T(W/_{SN}h)]$.

In the lower equation of [eq. 11], $\hat{E}[\partial h^T]$ of a first term is equal to a derivative of a non-normalized weight. From this viewpoint, a second term can be regarded as a normalization term which penalizes the first singular value component by using a compensation normalization factor $\lambda$. As long as $\delta$ and $W/_{SN}h$ indicate the same direction, $\lambda$ becomes a positive value, which prevents a column of W from concentrating at one direction during the training. In other words, the spectral normalization prevents a conversion in each layer from becoming sensitive in one direction.

By utilizing this effect of the normalization, various versions of algorithms can be studied. It is also possible to consider different parameterization of the weight matrix of the discriminator given as follows.

$$\tilde{W} := \gamma \overline{W}_{SN}, \quad \text{eq. 12}$$

Here, $\gamma$ is a scalar variable to be learned. This parameterization includes a 1-Lipschitz constraint in a target layer, but prevents the model from degenerating, and allows flexibility to be imparted to the model. In order to perform this reparameterization, a Lipschitz condition is controlled by another means such as a gradient penalty.

As described above, the spectral norm $\sigma(W)$ normalized in each layer of the network of the discriminator becomes the maximum singular value of W. In each round of the algorithm in this manner, simple application of the singular value decomposition causes a huge cost of calculation. Thus, a power iteration method may be used for evaluating $\sigma(W)$.

This method is started from vectors $\tilde{u}$ and $\tilde{v}$ initiated by a random number. If a dominant singular value does not become multiple, and $\tilde{u}$ and $\tilde{v}$ are not orthogonal to the first singular vector, $\tilde{u}$ and $\tilde{v}$ converge on the first left singular vector u and the first right singular vector v respectively based on the following update rule.

$$\tilde{v} \leftarrow W^T \tilde{u}/\|W^T \tilde{u}\|_2, \quad \tilde{u} \leftarrow W\tilde{v}/\|W\tilde{v}\|_2 \quad \text{eq. 13}$$

Moreover, as follows, the spectral norm of W can be approximated by a pair of approximate singular vectors as described above.

$$\sigma(W) \approx \tilde{u}^T W \tilde{v}. \quad \text{eq. 14}$$

If a stochastic gradient descent (SGD) is used for an update, a change in W in each update is small, and accordingly, the maximum singular value is changed. In implementation, by utilizing this fact, $\tilde{u}$ calculated in each step of the algorithm is reused as an initial vector in the next step. By this recycle procedure, one or more-round power iterations are performed.

Hereinafter, a method of the GAN based on the spectral normalization according to an embodiment of the present disclosure is explained based on a flowchart. FIG. 1 is a flowchart illustrating a flow of processing of this embodiment.

Note that, in the following explanation, an explanation regarding generator generation is omitted, but a method of the generator generation is not particularly limited. In this embodiment, generation of the discriminator is explained. Further, regarding processing similar to generation of a typical neural network model, for example, detailed explanations and the like of setting of hyperparameters, forward propagation, backward propagation, and the like are sometimes omitted. The learning of the discriminator may be performed by using the mini batch as described above, or as another example, performing the learning by batch learning or online learning also makes it possible to perform the processing similarly to the following.

First, neural network models of the generator and the discriminator may be set (S100). The set models are each, for example, a neural network model such as the MLP or the CNN as described above.

Next, regarding the weight matrix $W^l$ connecting the layers of the discriminator, initialization of a left singular vector $\tilde{u}_l (\in R^{dim(l)})$ is performed (S102). The initialization is performed by using a random number based on an isotropic normal distribution, for example.

After ending the initialization of the models and the variables, a transition to the learning of the generator and the discriminator may be made. As described above, the optimization of the generator and the discriminator is executed concurrently, or alternately in the steps by evaluating the respective output results based on the expression of [eq. 3] or the like.

Explanations from S104 to S110 in the following describe that processing with respect to the weight matrix W for each layer is performed. For example, processing of the weight matrix $W^l$ connecting the I–1-th layer and the I-th layer is explained.

In the backward propagation, for the update of the weight matrix, the spectral normalization may be used. For that reason, in back-propagation processing, first, the respective right and left singular vectors may be updated (S104). The update of the first singular vector may be executed based on the below-indicated expressions, for example.

$$\tilde{v}_l \leftarrow (W^l)^T \tilde{u}_l / \|(W^l)^T \tilde{u}_l\|_2$$

$$\tilde{u}_l \leftarrow W^l \tilde{v}_l / \|W^l \tilde{v}_l\|_2 \quad \text{eq. 15}$$

Here, $\tilde{u}_l$ indicates the left singular vector of the weight matrix $W^l$ and $\tilde{v}_l$ indicates the right singular vector of the weight matrix $W^l$ respectively. That is, by using the left singular vector $\tilde{u}_l$ initiated by the random number and the weight matrix $W_l$, the right singular vector $\tilde{v}_l$ may be updated. By using the updated right singular vector $\tilde{v}_l$ and the weight matrix $W^l$, the left singular vector $\tilde{u}_l$ may be updated. By performing a convergence operation in which alternate updates are performed based on the power iteration method in this manner, the first right singular vector and the first left singular vector may be calculated. This step may be optionally repeated predetermined several times.

Next, based on the updated left singular vector $\tilde{u}$ and right singular vector $\tilde{v}$, the weight matrix may be normalized (S106). This normalization is executed by the above-described spectral normalization based on a spectral norm of $W^I$. By using the spectral norm $\sigma(W^I)$ of $W^I$, for example, a weight matrix $W/_{SN}^I$ spectral may be normalized by the below-indicated mathematical formula.

$$\overline{W}_{SN}^I(W^I)=W^I/\sigma(W^I), \text{ where } \sigma(W^I)=\tilde{u}_I^T W^I \tilde{v}_I \qquad \text{eq. 16}$$

Next, based on the spectral normalized weight matrix $W/_{SN}^I$, an error may be calculated (S108). The correct answer data being the training data and the false data being an output result of the generator may be inputted to the discriminator and propagated forward. In an output layer, for example, in the result outputted from the discriminator, based on labels in which the output result of the generator is false and the output result of the correct answer data is true, the error in the output layer may be calculated.

As a more specific example, this step (S108) may include the next three steps. First, a first inference result of whether or not to determine that the correct answer data is correct answer data may be acquired. Next, a second inference result of whether or not to determine that the false data is not correct answer data may be acquired. Then, by such a loss function as represented by [eq. 3], based on these first inference result and second inference result, the error may be calculated. By propagating this error backward, as explained below, the weight matrix may be updated.

Next, based on the calculated error, the weight matrix $W^I$ may be updated (S110). For example, based on the following expression, the weight matrix $W^I$ may be updated.

$$W^I \leftarrow W^I - \alpha \nabla_{W^I} \ell(\overline{W}_{SN}^I(W^I), \mathcal{D}_M) \qquad \text{eq. 17}$$

Here, $W/_{SN}^I(W^I)$ indicates the spectral normalized weight matrix, and $D_M$ indicates a value obtained based on a predetermined dataset. For example, when mini batch processing is performed, $D_M$ indicates the update of the weight matrix $W^I$ based on a dataset in a mini batch. Further, $l$ indicates the loss function, and is the function based on [eq. 3] or the like, for example, the function represented by the later-described [eq. 18], the later-described [eq. 21] depending on the algorithm, or the like. These expressions calculate an overall error (loss) based on an error between the first inference result when the correct answer data is inputted to the data discriminator and a true value (a first partial error) and an error between the second inference result when the false data is inputted to the data discriminator and a false value (a second partial error). For example, a first term of [eq. 3] indicates the error between the first inference result and the true value, and a second term thereof indicates the error between the second inference result and the false value, and the loss may be calculated by finding the sum of these. The update indicated by [eq. 17] is based on an update by a typical SGD excluding use of the spectral normalized weight matrix $W/_{SN}^I$. When the learning is performed by mini batch learning or the like, the weight matrix may be further updated based on an output from each mini batch. The update of the weight matrix based on the output from each mini batch may be performed by a general method.

Next, whether or not to end the optimization may be judged (S112). The end of the optimization may be judged based on, for example, updating weight matrices in all layers, ending a predetermined number of epochs, an evaluation function satisfying a predetermined condition, the loss function satisfying a predetermined condition, and the like. When the learning such as the batch learning or the mini batch learning is performed, whether or not to end the learning with respect to required data may be judged.

For example, when the weight matrices are not updated in all the layers, the update of the weight matrix in the previous layer may be continued by propagating the calculated error backward. In a case after updating the weight matrices in all the layers with respect to all mini batches in an epoch, whether or not the number of epochs reaches the predetermined number of times may be judged, and the training may be ended or continued. In S112 in FIG. 1, end conditions at different levels may be collectively mentioned, but as a matter of course, the end conditions of the optimization may be set in more details, and the flowchart can be construed as a nested loop.

When the optimization is not ended (S112: No), the processing from S104 to S110 may be repeated. As described above, for example, when the weight matrices are not updated in all the layers, by propagating a loss backward to the layer previous to the layer in which the weight matrix has been updated in S110, the update processing of the weight matrix in the previous layer may be performed. When the predetermined number of epochs is not ended, the processing may be performed until the predetermined number of times is obtained. When the evaluation function, the loss function, or the like does not satisfy the predetermined condition, the processing may be performed until satisfying the predetermined condition. In the batch learning, the mini batch learning, or the like, the processing may be performed until ending the learning with respect to required data, and thereafter, the processing may be repeated until satisfying the above-described number of epochs and the conditions of the evaluation function and the loss function. Note that, in the above-described processing, in particular, as an initial value of the left singular vector, a vector optimized by the power iteration method in the previous step may be used.

When the optimization is ended (S112: Yes), a learned model may be outputted (S114), to end the processing.

Figures 2, 3:
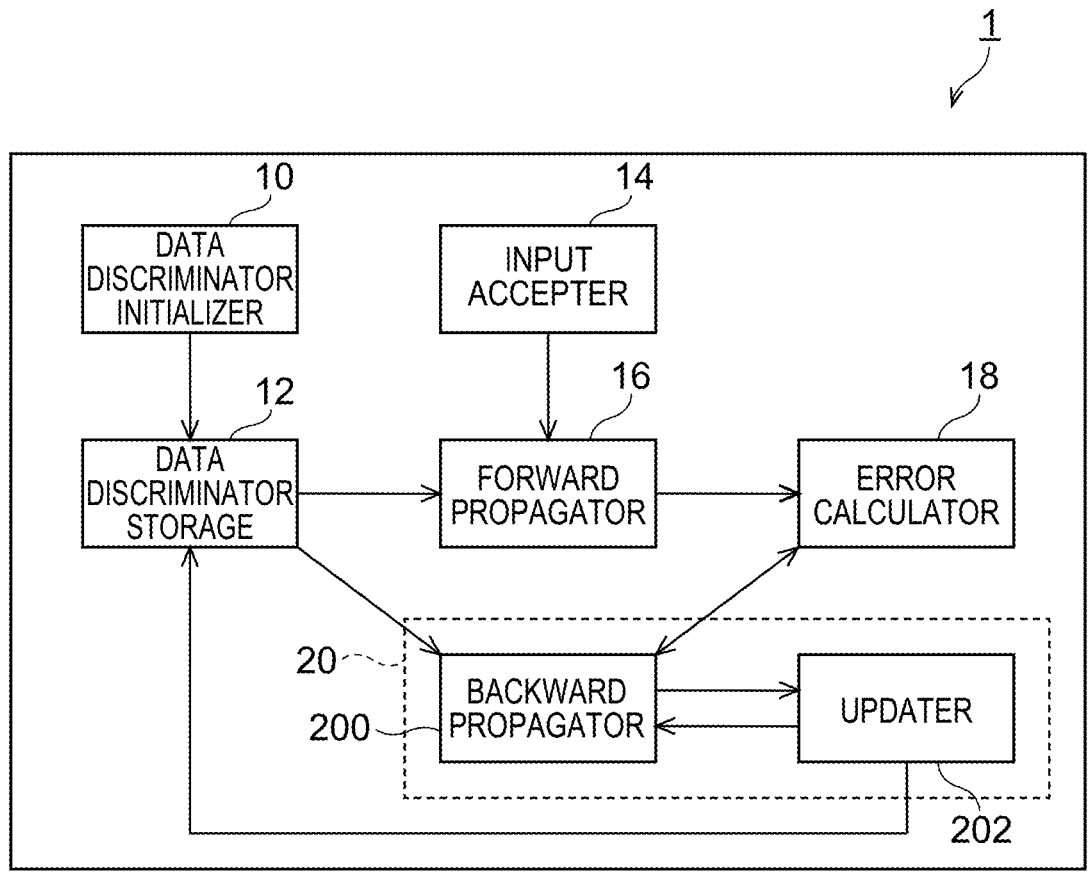
FIG. 2 is a block diagram illustrating a function of a data discrimination apparatus according to an embodiment.
FIG. 3 is a chart illustrating setting examples of parameters in a comparative experiment.

FIG. 2 is a block diagram illustrating a function of a data discriminator generating apparatus according to an embodiment of the present disclosure. A data discriminator generating apparatus 1 includes a data discriminator initializer 10, a data discriminator storage 12, an input accepter 14, a forward propagator 16, an error calculator 18, and a backward propagation block 20.

The data discriminator initializer 10 may initialize the model of the discriminator (data discriminator) in the GAN. For example, selection of the neural network model to be used as the model, the number of hidden layers, the weight matrix connecting the layers, and the like may be initialized. The selection of the neural network model and the number of hidden layers may accept designation by a user. The initialization of the weight matrix may accept the designation by the user, or may be automatically generated by the random number or the like. By the data discriminator initializer 10, the above-described processing in S100 may be performed. Further, together with the generation of the model, the initialization of the left singular vector of the weight matrix between the layers illustrated in S102 may be performed.

In some embodiments, the data discriminator initializer 10 is not included in the data discriminator generating apparatus 1. For example, the user may input the model generated in advance in the data discriminator storage 12, thereby allowing the model of the discriminator to be stored. As another example, the model generated by automatic processing in the outside of the data discriminator generating apparatus 1 may be inputted to the data discriminator storage 12, to be stored as the model of the discriminator.

The data discriminator storage 12 may store the model initialized by the data discriminator initializer 10, the model obtained by optimizing the above model, and the like. In the middle of learning, the model in which the weight matrix or the like has been updated may be stored. The forward propagator 16 and the backward propagation block 20 may perform the forward propagation and the backward propagation by using the model stored in this data discriminator storage 12, to update the above model.

The input accepter 14 may input (1) the false data which is data generated by the generator (data generator) and is similar to the correct answer data (training data) and (2) the correct answer data to the forward propagator 16. The discriminator may be optimized so as to discriminate between the false data generated by the generator and the correct answer data.

The forward propagator 16 may input the above-described false data or correct answer data to the data discriminator stored in the data discriminator storage 12, to perform the forward propagation.

The forward propagator 16 may input the data to an input layer of the data discriminator, and acquire a discrimination result from the output layer. As the data discriminator, the model stored in the data discriminator storage 12 may be used.

To calculate an error, the error calculator 18 may compare the output when the false data is inputted to the data discriminator and the output when the correct answer data is inputted to the data discriminator. For the calculation of the error, for example, the mathematical expression represented by [eq. 3] may be used. This error calculator 18 may perform the processing of S104. The error calculated by the error calculator 18 may be inputted to the backward propagation block 20, and the back-propagation processing may be executed. Further, the error calculator 18 may calculate the error during the back propagation. By using the calculated error, the backward propagation block 20 may perform the backward propagation of the error and the update of the weight matrix.

The backward propagation block 20 may update the model of the data discriminator stored in the data discriminator storage 12 by the back propagation. For example, the weight matrix (parameter) in the model may be updated. The backward propagation block 20 may include a backward propagator 200 and an updater 202.

The backward propagator 200 may perform the back-propagation processing based on the model of the data discriminator stored in the data discriminator storage 12 and the error calculated by the error calculator 18.

The updater 202 may particularly perform the processing to update the weight matrix in backward propagation processing. For example, this updater 202 may perform the processing from S104 to S110. As illustrated in the flowchart, at timing of propagating backward, by the update of the singular vectors in S106 and the processing of the normalization of the weight matrix in S108, the update of the weight matrix may be performed.

In a case of a model having L-layer hidden layers, first, the backward propagator 200 may propagate the error backward from the output layer to an L-th layer, and the updater 202 may update the weight matrix in the L-th layer. In a case of the mini batch learning, the weight matrix in the L-th layer may be updated in a mini batch. Next, the error may be propagated backward from the L-th layer to an L−1-th layer, to update the weight matrix in a similar manner. Thus, by successively propagating the error backward, the weight matrix in each layer may be updated. In the case of the mini batch learning, after ending the updates of the weight matrices of the hidden layers, and ending learning steps in the mini batch, for example, learning steps based on the evaluation values and the like as described above, the next mini batch may be generated, to update the weight matrices in the same manner. The processing of the mini batch may be performed by a general method.

In the above description, although an example of applying the spectral normalization to basic GAN has been explained, it is possible to apply the spectral normalization to not only the GAN but also algorithms of other GAN such as Wesserstein GAN (WGAN), Wesserstein GAN with Gradient Penalty (WGAN-GP), Deep Convolutional GAN (DC-GAN), and Deep Regret Analytic GAN (DRAGAN).

The stability of the learning of the GAN including the data discriminator generating apparatus 1 according to this embodiment is explained while citing an example of image generation by the generator generated by the GAN. In the following example, both the generator and the discriminator each perform the learning of a model based on the CNN.

In the following explanation, as the SGD in the back propagation, adaptive moment estimation (Adam) was used to perform simulations. Note that a SGD method other than the Adam or other methods such as Momentum, AdaGrad, RMSProp, and AdaDelta may be used. As the loss function to be used for the update of the discriminator in this embodiment, the following expression was used.

$$\min_G \max_D V(G, D) := \underset{x \sim q_{data}}{E}[\log D(x)] + \underset{z \sim p(z)}{E}[\log(1 - D(G(z)))] \quad \text{eq. 18}$$

Further, as a cost function to be used for the update of the generator, the below-indicated expression was used.

$$-\underset{z \sim p(z)}{E}[\log(D(G(z)))] \quad \text{eq. 19}$$

As evaluation of pieces of false data generated by generators in this embodiment and comparative examples, an inception score defined as follows was used.

$$I(\{x_n\}_{n=1}^N) := \exp(E[D_{KL}[p(y|x) \| p(y)]]) \quad \text{eq. 20}$$

Here, $D_{KL}[\cdot]$ represents a KL divergence (Kullback-Leibler Divergence). Further, p(y) can be calculated as a marginal probability by $(1/N)\Sigma_{n=1}^{N} p(y|x_n)$.

FIG. 3 cites parameter examples of the simulations. Set terms indicate the respective parameter names. $\alpha$, $\beta_1$, and $\beta_2$ are each a hyperparameter in the Adam. $\alpha$ indicates a learning rate, $\beta_1$ indicates a primary momentum, and $\beta_2$ indicates a secondary momentum, respectively. $n_{dis}$ indicates the number of times at each of which the discriminator is updated for each one-time update of the generator. A combination of these parameters is indicated as one example for describing simulation results, and is not an important point but a point allowing arbitrary changes in the GAN method of using the spectral normalization according to an embodiment of the present disclosure.

The set A is a parameter indicated by a thesis of the WGAN-GP method. The set B is a parameter indicated by a thesis. The set C is a parameter indicated by a thesis of a DCGAN (Deep Convolutional GAN) method.

The set A to the set C are examples each cited for comparison with the result reported already as the thesis. On the other hand, the set D to the set F are parameter sets each set for evaluating improvement in algorithm in a situation in which active learning is further performed. In each of these sets, 100,000-time updata of the generator was learned.

Hereinafter, in the charts, learning of the generator using learning of the discriminator by the spectral normalization according to this embodiment is mentioned as SN. Further, results obtained by setting the respective methods of WN and WGAN-GP as comparison objects are mentioned as Comparative example 1 and Comparative example 2 respectively.

Figure 4A:
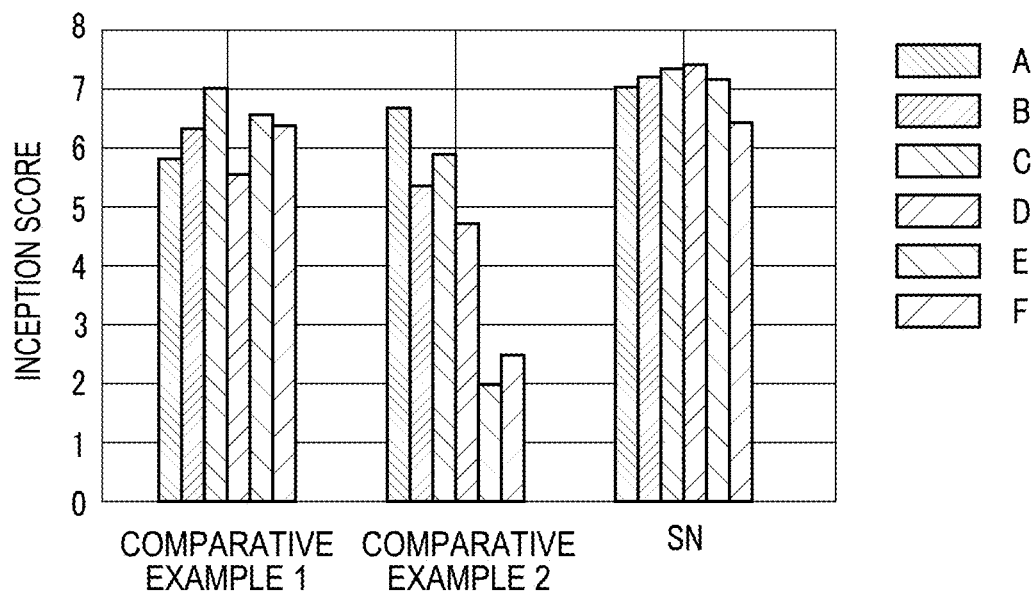
FIG. 4A is a graph illustrating inception scores in the comparative experiment.
Figure 4B:
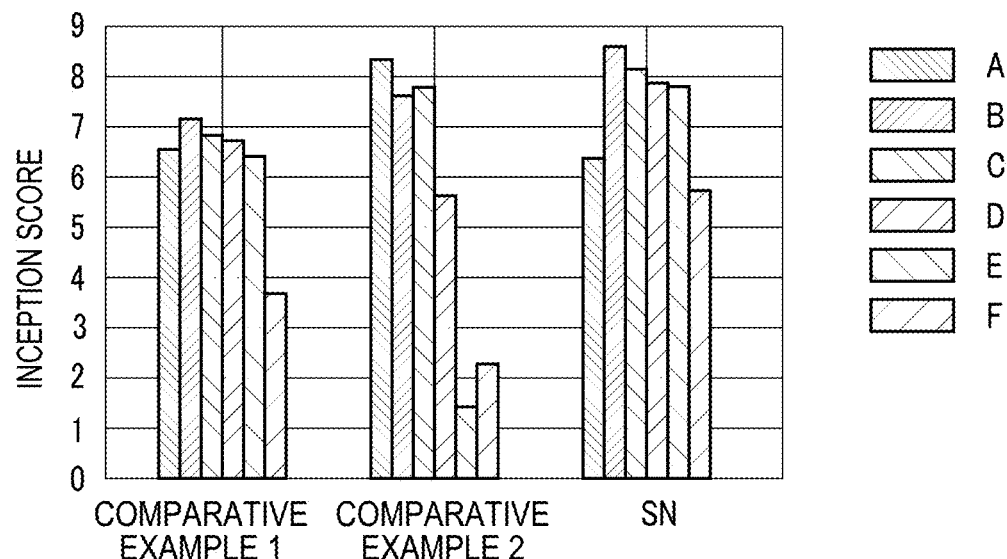
FIG. 4B is a graph illustrating inception scores in the comparative experiment.

FIG. 4A, in which images of a dataset CIFAR-10 are used, and FIG. 4B, in which images of a dataset STL-10 are used, are graphs illustrating results of performing the simulations in the respective settings illustrated in FIG. 3. A vertical axis indicates the above-described inception score.

Based on these charts, it can be read that the SN is robuster than Comparative example 1 and Comparative example 2 with respect to active learning rate and momentum parameters. Comparative example 2 fails in obtaining good output results by the GAN with respect to a high learning rate and a high momentum parameter. Comparative example 1 can ensure less effectiveness of optimization than that of the SN and Comparative example 2 in the STL-10 configured by more various examples than those of the CIFAR-10. The SN is more excellent than other methods in both the other CIFAR-10 and STL-10.

FIG. 5A, in which the images of the dataset CIFAR-10 are used, and FIG. 5B, in which the images of the dataset STL-10 are used, are tables illustrating results of the inception scores obtained by using the SN, Comparative example 1, Comparative example 2, and other methods. Real data indicates the inception score acquired by using data in each of the datasets.

As illustrated in FIG. 5A, it is found that the SN scores a better inception score except the Warde-Farley (a method of the thesis described in the set B in FIG. 3). In the STL-10 configured by the images having more variety than that of the CIFAR-10, the SN has a better inception score than any other method.

Figure 6:
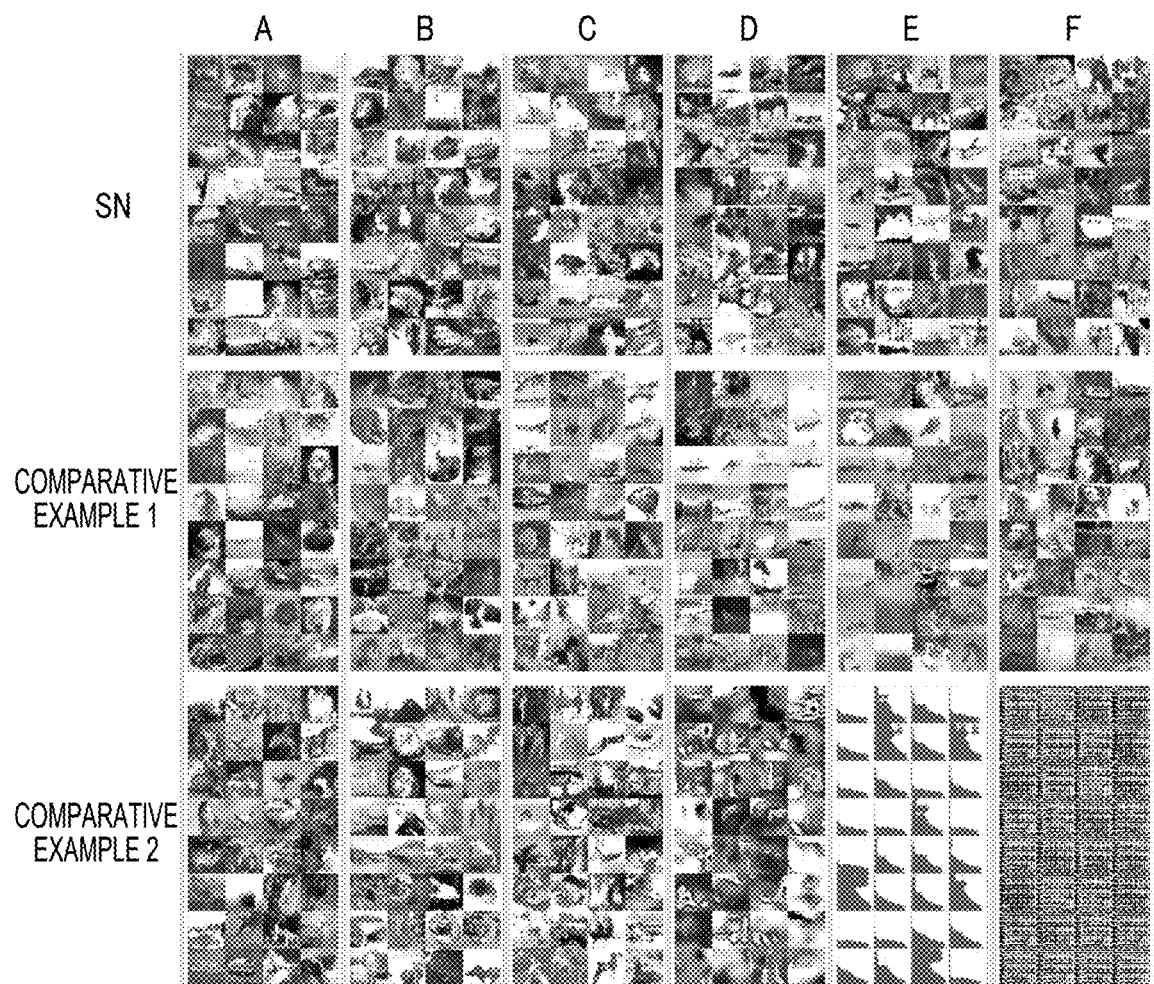
FIG. 6 is charts illustrating examples of output results in the comparative experiment.
Figure 7:
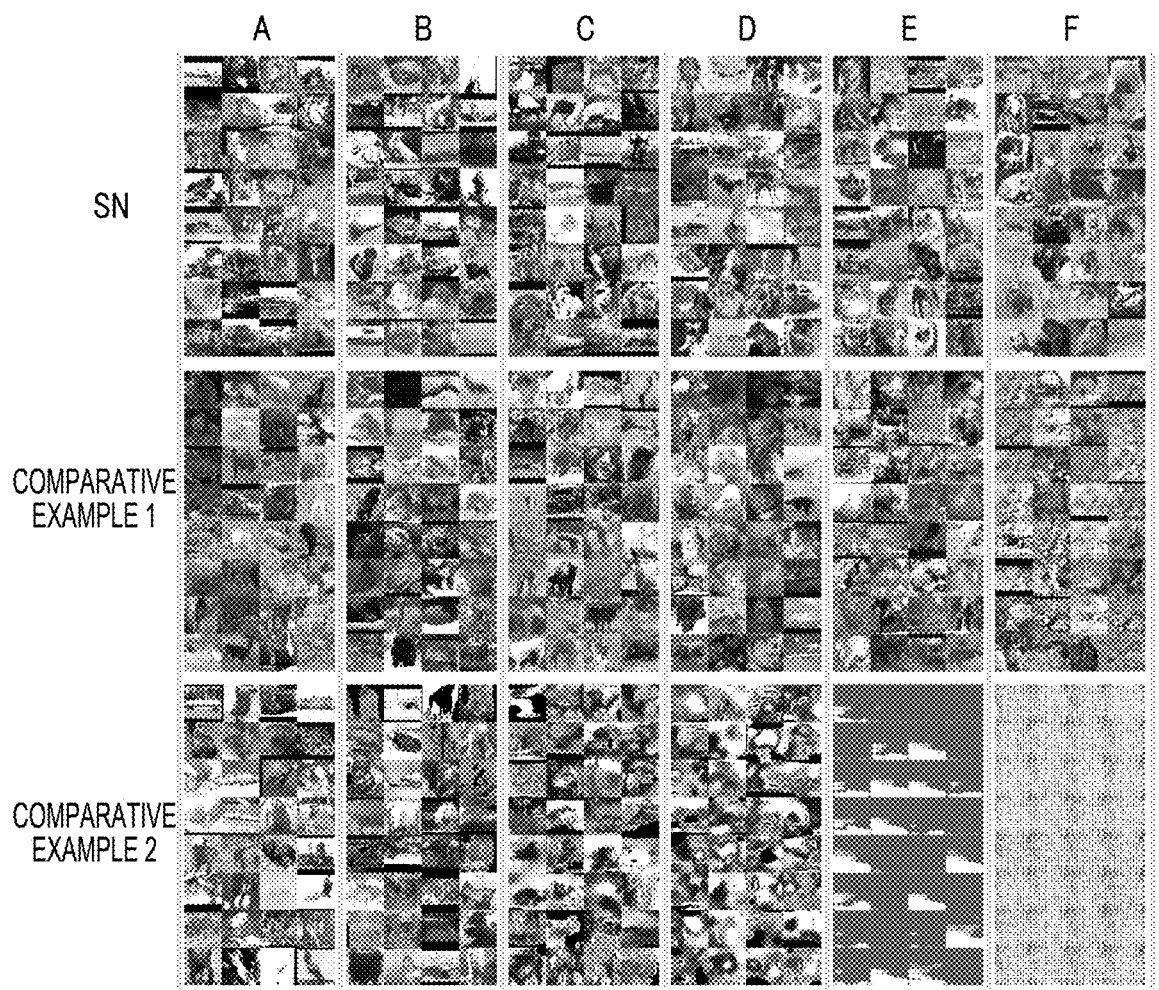
FIG. 7 is charts illustrating examples of output results in the comparative experiment.

FIG. 6 illustrates images generated by the generators learned by using an image of the dataset CIFAR-10, and FIG. 7 illustrates images generated by the generators learned by using an image of STL-10.

A 48×48-pixel image depicted in the upper portion in each of FIG. 6 and FIG. 7 and divided into 8×8 blocks is an image provided for the learning as the dataset. Images depicted in the lower portion in each of FIG. 6 and FIG. 7 are images generated by the generators learned by the GAN using the SN, Comparative example 1, and Comparative example 2 in order from above. Thus, when the generated images are seen, the images generated by the generator by the SN are seen as relatively good results.

In particular, in a case of citing the learning rate, good results are outputted in contrast with those in Comparative example 1 and Comparative example 2. In the set D to the set F, in Comparative example 1, for example, the images each having a low contrast overall such that the whole image is almost the same color are outputted, and in Comparative example 2, most of the outputted data is noise data. On the other hand, based on the SN according to an embodiment of the present disclosure, data having a relatively high contrast is generated.

Figure 8:
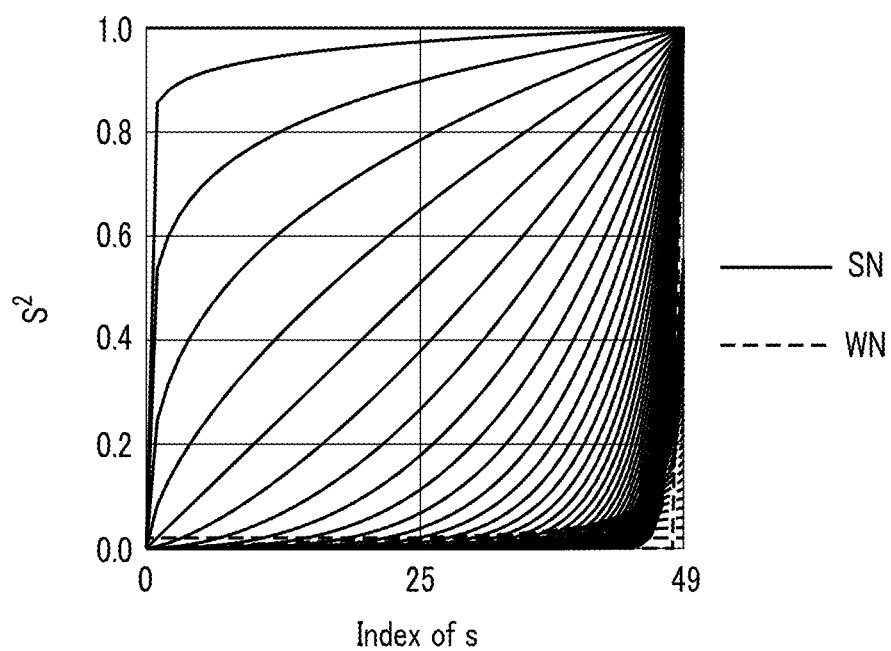
FIG. 8 is a chart illustrating theoretical values of sizes of singular values of weight matrices in the comparative experiment.

FIG. 8 is a chart illustrating theoretical values indicating a region where square values of singular values of weight matrices in the SN and Comparative example 1 are present. In FIG. 8 and FIG. 9, the singular values of the weight matrices are lined in ascending order, and the index is set as a horizontal axis and the one obtained by normalizing the square value of each of the singular values by using a maximum singular value is set as a vertical axis. A graph in FIG. 8 illustrates a distribution of the theoretical values likely to be taken in various situations with respect to the weight matrices. Solid lines indicate the theoretical values in the SN, and broken lines indicate the theoretical values in Comparative example 1. As illustrated in this FIG. 8, in the SN, a width in which the singular values are present is found to be wider than that in Comparative example 1.

In Comparative example 1, due to an asymmetric distribution of the singular values, column space of the weight matrix becomes low-dimensional vector space. On the other hand, in the SN, the number of dimensions of features to be used by the discriminator can be utilized without compromise. In order to keep the norm of the output of the hidden layer which has been multiplied by the weight matrix as much as possible, and make accuracy of the discriminator higher, it is desired to make this (normalized) norm large.

For example, in Comparative example 1, in order to make the norm large, a rank is lowered, but lowering the rank results in a reduction in the number of feature amounts being a judgment material in the discriminator. In more details, the judgment based on each feature amount depends on a size of the norm of the singular value. That is, as in Comparative example 1, when only a part of the singular values take a large value, and the other singular values become about "0" (zero), the emphasis is on the feature amount having a large norm of the singular value, which reduces an effect which the feature amount having a small norm of the singular value has on the judgment. However, in order to learn the discriminator having higher accuracy, to reduce the number of feature amounts is not a good idea. In Comparative example 1 as described above, in order to learn the discriminator having higher accuracy, it is difficult to achieve both to make the norm large (many norms can be acquired) and to prevent the number of feature amounts from being reduced.

As illustrated in FIG. 8, the SN can keep the normalized norm larger than that in Comparative example 1. That is, the SN can achieve both to keep the norm large and to prevent the number of feature amounts from being reduced. This is based on a Lipschitz constant in a linear operation being evaluated only by a maximum singular value. That is, the spectral norm is based on being independent of the rank of the matrix.

Figure 9A:
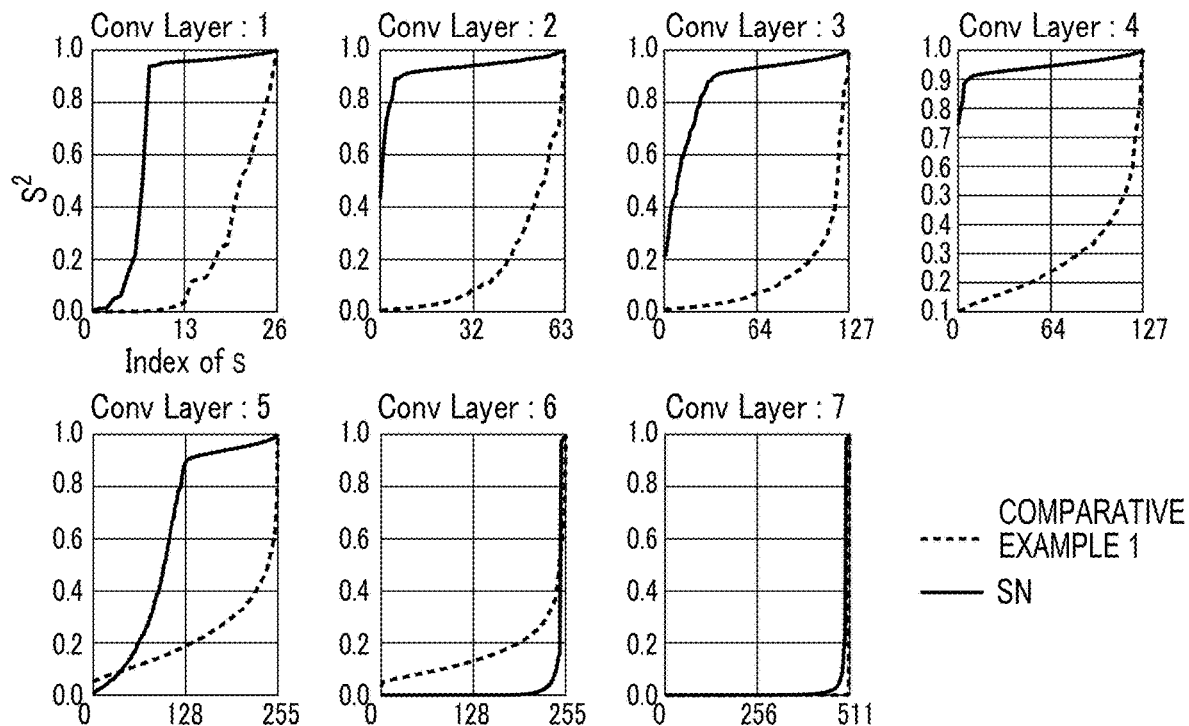
FIG. 9A is charts illustrating sizes of singular values of weight matrices in the comparative experiment.
Figure 9B:
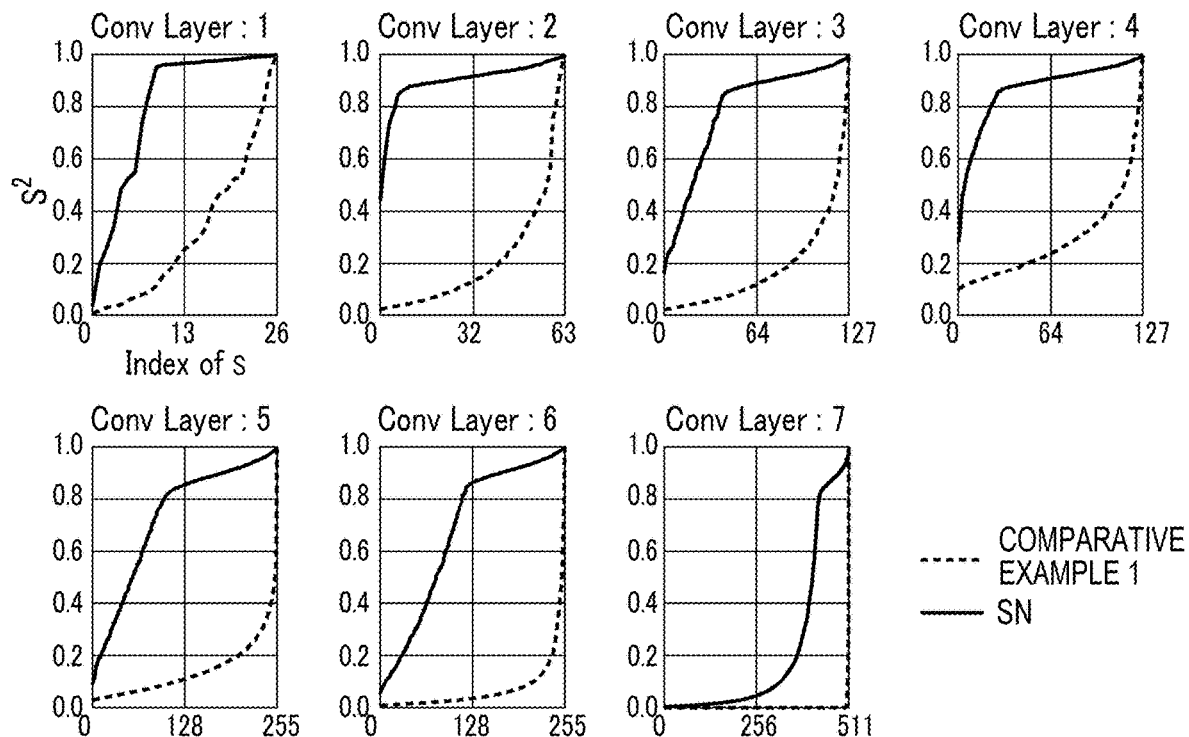
FIG. 9B is charts illustrating sizes of singular values of weight matrices in the comparative experiment.

Each of FIG. 9A and FIG. 9B is graphs illustrating the square values of singular values of weight matrices in the respective layers when the learning is performed by using the SN and Comparative example 1 being different methods. In FIG. 9A, the dataset of CIFAR-10 is used, and in FIG. 9B, the dataset of STL-10 is used. Similarly to FIG. 8, solid lines indicate results obtained by the SN, and broken lines indicate results obtained by Comparative example 1.

As illustrated in FIG. 9A and FIG. 9B, according to the SN, it is found that the norms of the singular values are larger in almost all ranges than those in Comparative example 1. Thus, it becomes possible to make the norm of the singular value large and prevent the rank from being lowered, and when the normalization is performed, rank stability can be ensured.

In a first layer to a fifth layer, in Comparative example 1, there are concentrations at some values. That is, in Comparative example 1, the ranks of the weight matrices in these layers are short. On the other hand, in the SN, there is a wide distribution. In a case of targeting discrimination of a pair of probability distributions of various powers of low-dimensional nonlinear data embedded in high-dimensional space, there is a probability that the shortage of the rank in a lower layer is particularly fatal. An output of the lower layer is an output via a set having a small number of linear transformations, and most of the output exhibits a deflection to a space being linear. The undervaluation of many features of an input distribution in such a space causes an excessively simplified discriminator to be generated.

According to simulation results illustrated in FIG. 7, an effect which the excessively simplified discriminator has as described above can be actually confirmed. The images generated by using the spectral normalization have more variety, and are more complicated images than the images obtained by Comparative example 1.

Figure 10A:
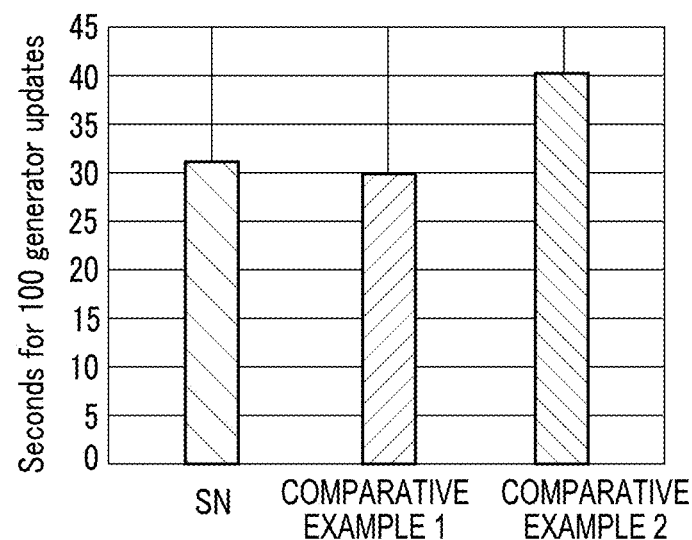
FIG. 10A is a chart illustrating processing times in the comparative experiment.
Figure 10B:
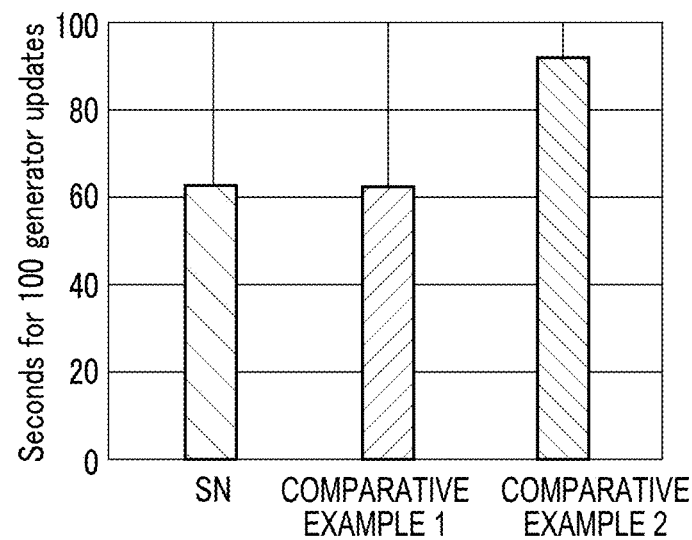
FIG. 10B is a chart illustrating processing times in the comparative experiment.

FIG. 10A and FIG. 10B are charts each illustrating operation times in a case of updating the generator 100 times. A vertical axis indicates the operation time [second] in a case of updating the generators in the various methods 100 times. FIG. 10A illustrates results obtained by using the dataset CIFAR-10, and FIG. 10B illustrates results obtained by using the dataset STL-10. In Comparative example 2, as an error function, $\|\nabla \times D\|_2$ being the gradient penalty (GP) is required to be additionally found, which requires longer time than the other methods.

These charts illustrate that the SN can perform the operation in a time almost equal to that in Comparative example 1. This is because a relative calculation cost required for the power iteration method is negligibly smaller than costs of the forward propagation and the backward propagation.

As described above, based on the SN method according to an embodiment of the present disclosure, in the update of the weight matrix of each layer in the GAN, by using the spectral normalized weight matrix, it becomes possible to achieve stable learning of the discriminator. As read from the results, more variety than that in the comparative examples allows the generation of the complicated images. Moreover, regarding the processing time, it does not take as long time as that in Comparative example 1, and for example, the case of using the dataset of STL-10, or the like allows processing in an almost equal time.

MODIFIED EXAMPLE

In the above-described embodiments, the example of applying the spectral normalization to the method of the GAN has been described, but this is not restrictive. That is, the spectral normalization may be applied to the method of the WGAN-GP (Comparative example 2). Hereinafter, the one applying the SN to Comparative example 2 is represented as Comparative example 2+SN, or the like. In this case, as the error function, the following expression may be used.

$$V(G, D) := \underset{x \sim q_{data}}{E}[D(x)] - \underset{z \sim p(z)}{E}[D(G(z))] + \lambda \underset{\hat{x} \sim P'_x}{E}\left[(\|\nabla_{\hat{x}} D(\hat{x})\|_2 - 1)^2\right] \quad \text{eq. 21}$$

Simulation results are illustrated in FIG. 11. FIG. 11 is a table illustrating inception scores regarding Comparative example 2+SN. The application of the SN regarding a standard CNN and the application of the SN regarding the CNN using a residual network (ResNet) are illustrated. As comparisons, results of Comparative example 2+Comparative example 1 and Comparative example 2 are also illustrated. In the simulation, all functions represented by [eq. 12] in the learning of the discriminator were normalized by the methods of the SN and Comparative example 1. Based on FIG. 11, the inception score is improved more than those in Comparative example 2 and Comparative example 2+Comparative example 1.

Figure 12A:
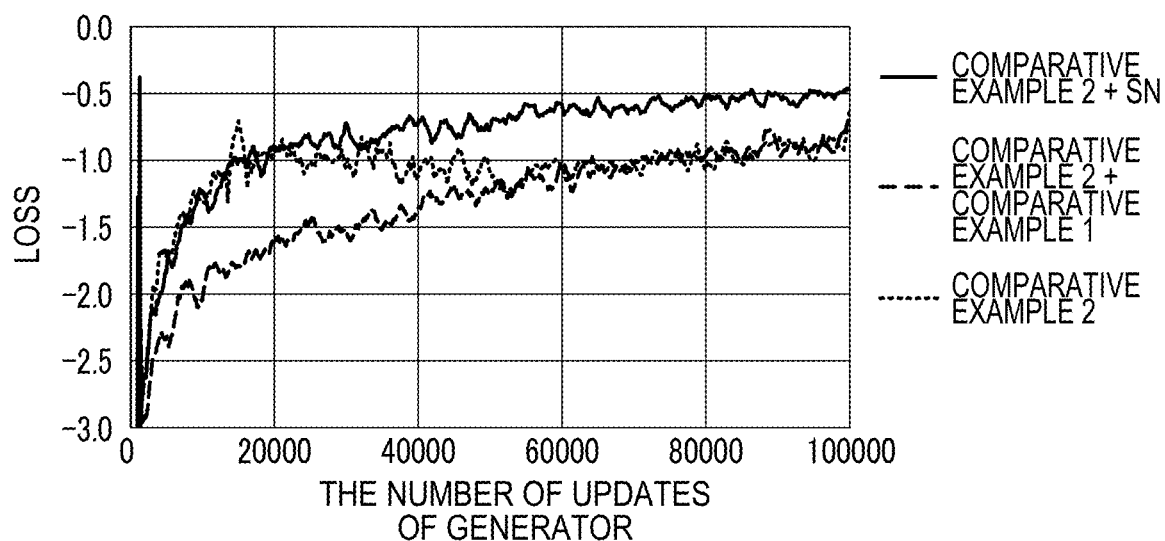
FIG. 12A is a chart illustrating losses in the comparative experiment.
Figure 12B:
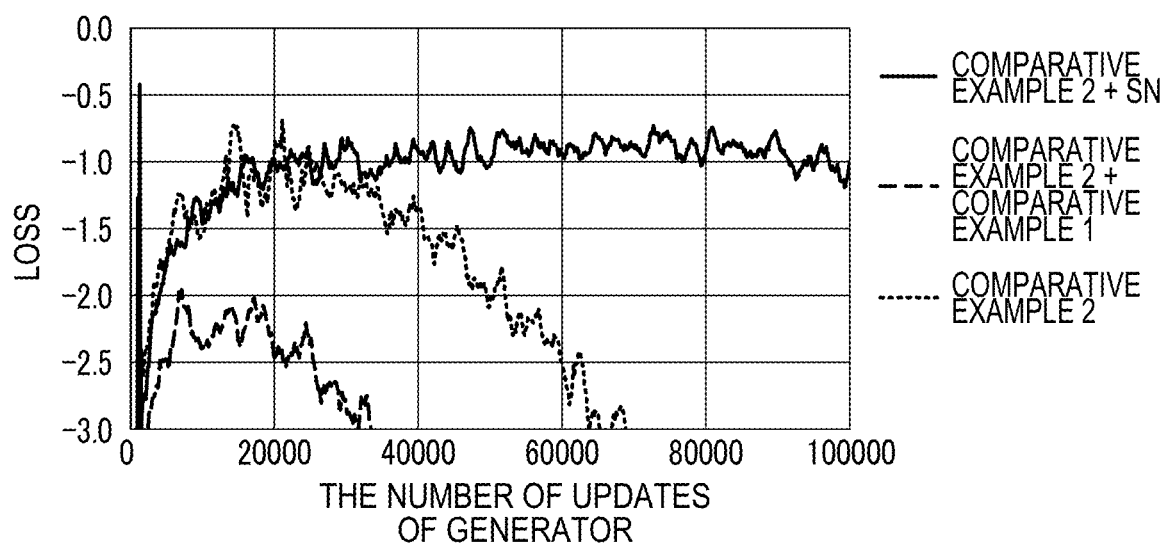
FIG. 12B is a chart illustrating losses in the comparative experiment.

FIG. 12A is a chart illustrating losses as evaluation, and FIG. 12B is a chart illustrating losses of validation. Solid lines indicate results obtained by Comparative example 2+SN, broken lines indicate results obtained by Comparative example 2+Comparative example 1, and dotted lines indicate results obtained by Comparative example 2. These charts each illustrate that the learning performed by Comparative example 2+SN is less overtraining than the learning performed by Comparative example 2 and Comparative example 2+Comparative example 1. FIG. 12B particularly illustrates that the learning performed by Comparative example 2+SN is less overtraining than the learning performed by the other methods because an evaluation value thereof does not fall also with respect to validation data.

Figure 13:
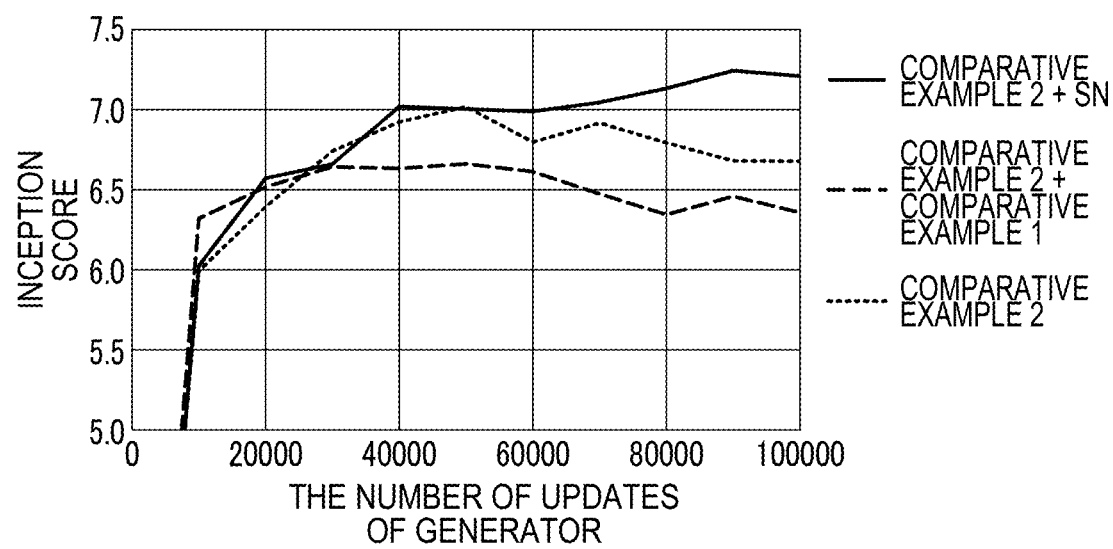
FIG. 13 is a chart illustrating inception scores in the comparative experiment.

FIG. 13 is a chart illustrating inception scores in the same simulation situation. A solid line indicates a result obtained by Comparative example 2+SN, a broken line indicates a result obtained by Comparative example 2+Comparative example 1, and a dotted line indicates a result obtained by Comparative example 2. This FIG. 13 also illustrates the respective cases of degrees of overtraining. Not final results but even the optimum ones sampled during the learning indicate that the method according to Comparative example 2+SN (7.28) has the inception score better than those in the other methods (7.04, 6.69).

As described above, in not only the standard GAN but also the method of WGAN-GP, the spectral normalization according to an embodiment of the present disclosure can provide more stable learning of the discriminator.

Note that, in the above-described example, the training as the data discriminator discriminates data based on training data provided with a label of whether or not to be correct answer data, but this is not restrictive. Without being limited to the GAN, for example, by using training data labeled with a category, the above-described weight matrix may be updated, thereby also allowing training as a classifier. Moreover, other than these, a neural network model which performs training by updating a typical weight matrix makes it possible to apply a training method using the above-described spectral normalization to the update of the weight matrix. Performing the normalization represented by [eq. 9] makes it possible to perform the normalization of these weighting matrices and update the weighting matrices. Furthermore, by using training data labeled with a plurality of labels, such training as being able to output continuous values or discrete values with respect to an input may be performed.

In the above-described entire description, at least a part of the data discriminator generating apparatus 1 may be configured by hardware, or may be configured by software and a CPU and the like may perform the operation based on information processing of the software. When it is configured by the software, a program which achieves the data discriminator generating apparatus 1 and at least a partial function thereof may be stored in a storage medium such as a flexible disk or a CD-ROM, and executed by making a computer read it. The storage medium is not limited to a detachable one such as a magnetic disk or an optical disk, but it may be a fixed-type storage medium such as a hard disk device or a memory. That is, the information processing by the software may be concretely implemented by using a hardware resource. Furthermore, the processing by the software may be implemented by the circuit of a FPGA (Field-Programmable Gate Array) or the like and executed by the hardware. Processing of construction of a virtual environment, or the like may be performed by using, for example, an accelerator such as a GPU (Graphical Processing Unit).

The data discriminator generating apparatus 1 and the data discriminator generated by the apparatus may be configured by an analog circuit or a digital circuit other than generated by the program as described above. In this case, a control circuit which controls a part of or the entire function may be included. That is, the data discriminator generating apparatus 1 and the data discriminator may include the control circuit and a memory, and a part of or the entire function may be controlled by the control circuit.

A person skilled in the art may come up with addition, effects or various kinds of modifications of the present disclosure based on the above-described entire description, but, examples of the present disclosure are not limited to the above-described individual embodiments. Various kinds of addition, changes and partial deletion can be made within a range that does not depart from the conceptual idea and the gist of the present disclosure derived from the contents stipulated in claims and equivalents thereof.

The invention claimed is:

1. A training method comprising:
    calculating, by at least one processor, a normalized weight matrix by normalizing, using a spectral normalization, a first weight matrix of a discriminator; and
    updating, by the at least one processor, the first weight matrix of the discriminator, at least based on:
        a first output of the discriminator for correct data, obtained by using the normalized weight matrix, and
        a second output of the discriminator for false data generated by a generator, obtained by using the normalized weight matrix.

2. The training method according to claim 1 further comprising calculating, by the at least one processor, an error based on at least one of the first output or the second output of the discriminator, wherein the first weight matrix of the discriminator is updated based on the error.

3. The training method according to claim 1, wherein the spectral normalization is a normalization of the first weight matrix based on a spectral norm of the first weight matrix.

4. The training method according to claim 1, wherein the spectral normalization is a normalization of the first weight matrix based on a singular value of the first weight matrix.

5. The training method according to claim 4, wherein the singular value is a maximum singular value of the first weight matrix.

6. The training method according to claim 4, wherein the singular value is calculated by power iteration method.

7. The training method according to claim 4, further comprising calculating, by the at least one processor, a left singular vector and a right singular vector of the first weight matrix, wherein the singular value is calculated based on the left singular vector and the right singular vector.

8. The training method according to claim 7, further comprising:
    updating, by the at least one processor, the right singular vector based on the first weight matrix and the left singular vector; and
    updating, by the at least one processor, the left singular vector based on the first weight matrix and the updated right singular vector.

9. The training method according to claim 1, wherein the first weight matrix includes parameters of a neural network model.

10. The training method according to claim 9, wherein the neural network model comprising a Convolutional Neural Network (CNN).

11. The training method according to claim 1, wherein the first weight matrix is a weight matrix between layers of the discriminator.

12. The training method according to claim 1, further comprising updating, by the at least one processor, weight matrices of a plurality of layers of the discriminator based on a spectral normalization.

13. The training method according to claim 1, wherein the correct data and the false data are image data.

14. A device comprising:
    at least one memory; and
    at least one processor configured to:
        calculate a normalized weight matrix by normalizing, using a spectral normalization, a first weight matrix of a discriminator; and
        update the first weight matrix of the discriminator, at least based on:
            a first output of the discriminator for correct data obtained by using the normalized weight matrix, and
            a second output of the discriminator for false data generated by a generator, obtained by using the normalized weight matrix.

15. The device according to claim 14, wherein the at least one processor is further configured to calculate an error based on at least one of the first output or the second output of the discriminator, wherein the first weight matrix of the discriminator is updated based on the error.

16. The device according to claim 14, wherein the spectral normalization is a normalization of the first weight matrix based on a spectral norm of the first weight matrix.

17. The device according to claim 14, wherein the spectral normalization is a normalization of the first weight matrix based on a singular value of the first weight matrix.

18. The device according to claim 17, wherein the singular value is a maximum singular value of the first weight matrix.

19. The device according to claim 17, wherein the singular value is calculated by power iteration method.

20. The device according to claim 14, wherein the first weight matrix includes parameters of a neural network model.

21. The device according to claim 14, wherein the first weight matrix is a weight matrix between layers of the discriminator.

22. The device according to claim 14, wherein the at least one processor is further configured to update weight matrices of a plurality of layers of the discriminator based on a spectral normalization.

23. A non-transitory computer readable medium stored therein a program which causes at least one processor to execute:
    calculating a normalized weight matrix by normalizing, using a spectral normalization, a first weight matrix of a discriminator; and
    updating the first weight matrix of the discriminator, at least based on:
        a first output of the discriminator for correct data, obtained by using the normalized weight matrix, and
        a second output of the discriminator for false data generated by a generator, obtained by using the normalized weight matrix.

24. The non-transitory computer readable medium according to claim 23, wherein the program further causes the at least one processor to execute calculating an error based on at least one of the first output or the second output of the discriminator, wherein the first weight matrix of the discriminator is updated based on the error.

25. The non-transitory computer readable medium according to claim 23, wherein the spectral normalization is a normalization of the first weight matrix based on a spectral norm of the first weight matrix.

26. The non-transitory computer readable medium according to claim 23, wherein the spectral normalization is a normalization of the first weight matrix based on a singular value of the first weight matrix.

27. The non-transitory computer readable medium according to claim 26, wherein the singular value is a maximum singular value of the first weight matrix.

28. The non-transitory computer readable medium according to claim 26, wherein the singular value is calculated by power iteration method.

29. The non-transitory computer readable medium according to claim 23, wherein the first weight matrix includes parameters of a neural network model.

30. The non-transitory computer readable medium according to claim 23, wherein the first weight matrix is a weight matrix between layers of the discriminator.

31. The non-transitory computer readable medium according to claim 23, wherein the program further causes the at least one processor to execute updating weight matrices of a plurality of layers of the discriminator based on a spectral normalization.

\* \* \* \* \*